US011539766B1

(12) United States Patent
VanBlon et al.

(10) Patent No.: US 11,539,766 B1
(45) Date of Patent: Dec. 27, 2022

(54) SELECTION OF IMAGES TO TRANSMIT AS PART OF VIDEO CONFERENCE BASED ON NETWORK ISSUES AND/OR OTHER CONDITIONS

(71) Applicant: Lenovo (United States) Inc., Morrisville, NC (US)

(72) Inventors: Russell Speight VanBlon, Raleigh, NC (US); Robert J. Kapinos, Durham, NC (US); Robert James Norton, Jr., Raleigh, NC (US); Scott Wentao Li, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/520,492

(22) Filed: Nov. 5, 2021

(51) Int. Cl.
*H04L 65/403* (2022.01)
*G06T 7/00* (2017.01)
*G06V 40/16* (2022.01)
*H04L 65/75* (2022.01)

(52) U.S. Cl.
CPC .......... *H04L 65/403* (2013.01); *G06T 7/0002* (2013.01); *G06V 40/161* (2022.01); *G06V 40/174* (2022.01); *H04L 65/75* (2022.05); *G06T 2207/10016* (2013.01); *G06T 2207/30168* (2013.01); *G06T 2207/30201* (2013.01)

(58) Field of Classification Search
CPC ......... H04L 29/06; H04L 65/403; G06K 9/00; G06T 7/00; H04N 7/15; H04N 7/147
USPC .......................................... 348/14.01–14.16
See application file for complete search history.

(56) References Cited

U.S. PATENT DOCUMENTS

| | | | |
|---|---|---|---|
| 2007/0126875 A1* | 6/2007 | Ml ................... | G08B 13/19667 348/E7.086 |
| 2015/0067811 A1 | 3/2015 | Agnew et al. | |
| 2015/0381930 A1* | 12/2015 | Quinn ................... | H04N 7/147 348/14.14 |
| 2016/0006772 A1* | 1/2016 | Shimizu .............. | H04L 12/1827 709/204 |
| 2016/0225405 A1 | 8/2016 | Matias et al. | |
| 2016/0352794 A1* | 12/2016 | Guo ...................... | H04L 65/765 |
| 2016/0366369 A1* | 12/2016 | Balasaygun ........... | H04N 7/147 |

(Continued)

FOREIGN PATENT DOCUMENTS

WO WO-2021074005 A1 * 4/2021 ......... H04L 65/1069

OTHER PUBLICATIONS

Peterson et al., "Use of Slow Motion Video Capture Based on Identification of One or More Conditions", file history of related U.S. Appl. No. 16/688,768, filed Nov. 19, 2019.

*Primary Examiner* — Melur Ramakrishnaiah
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to, during video conferencing and based on at least one identified condition (such as an issue with a network being used for the video conferencing), select a first image from plural images received from a camera. The plural images may be associated with the video conferencing. The instructions may also be executable to provide the first image to a second device different from the first device but decline to provide at least a second image from the plural images.

20 Claims, 5 Drawing Sheets

(56) References Cited

U.S. PATENT DOCUMENTS

| | | | |
|---|---|---|---|
| 2017/0169659 A1* | 6/2017 | Froy | G07F 17/3244 |
| 2017/0199789 A1* | 7/2017 | Milvaney | G06Q 10/101 |
| 2018/0349708 A1 | 12/2018 | Hoof et al. | |
| 2020/0162665 A1 | 5/2020 | Szasz | |

* cited by examiner

600

Settings

☐ Enable Dynamic, Optimal Image Selection ～602

☐ Use Better-Quality Images Than During Normal Streaming ～604

Select Conditions: ／606

☐ Image Shows My Face

☐ I Am Being Still

☐ I Am Looking At/Near Camera

☐ I Am Smiling And/Or Speaking

☐ No Blurry Face Images

☐ My Mouth Is Not Agape

☐ Bandwidth/Connectivity Issue

☐ Metered Network/Data Limit Being Reached/Additional Charges Will Be Incurred

☐ Low Battery Threshold Approached/Reached

☐ No Images Of Me Drinking Or Doing Other Actions/Showing Me With Objects Unrelated To Video Conferencing 608      610

Low Battery Threshold: ☐ % S.O.C

FIG. 6

SELECTION OF IMAGES TO TRANSMIT AS PART OF VIDEO CONFERENCE BASED ON NETWORK ISSUES AND/OR OTHER CONDITIONS

FIELD

The disclosure below relates to technically inventive, non-routine solutions that are necessarily rooted in computer technology and that produce concrete technical improvements. In particular, the disclosure below relates to techniques for selection of images to transmit as part of a video conference based on network issues and/or other conditions.

BACKGROUND

As recognized herein and specifically during electronic video conferencing, network issues may arise such as insufficient bandwidth to transmit or receive all image frames for one of the conferees. This in turn can cause the video conferencing software to freeze or at least appear to freeze, and can also result in less-than-flattering images of a given conferee persisting on the display of another conferee's device. There are currently no adequate solutions to the foregoing computer-related, technological problem.

SUMMARY

Accordingly, in one aspect a first device includes at least one processor and storage accessible to the at least one processor. The storage includes instructions executable by the at least one processor to, during video conferencing and based on at least one identified condition, select a first image from plural images received from a camera. The plural images are associated with the video conferencing. The instructions are also executable to provide the first image to a second device different from the first device but decline to provide at least a second image from the plural images.

In some examples, the first device may include the camera and the plural images may be established by a particular number of frames per time increment.

Additionally, in various example implementations the at least one identified condition may include a conferee's face being shown in the first image, a conferee as shown in the first image looking at the camera, and/or a conferee smiling as shown in the first image.

Also in some example implementations, the at least one identified condition may include a first identified condition such as a conferee not having their mouth agape while not speaking as shown in the first image (where the second image might show the conferee's mouth agape while not speaking), and/or the first image exhibiting a lack of blurry feature boundaries for a conferee's face (where the second image might include at least one blurry feature boundary for the conferee's face). In these examples, the conferee may be a first conferee of the video conferencing, and the at least one identified condition may include a second identified condition including a bandwidth issue and/or connectivity issue between client devices of the first conferee and a second conferee with whom the first conferee is conversing as part of the video conferencing.

In some example embodiments, the first device may include a server facilitating the video conferencing, and the first device may receive the plural images from a third device established by a client device. Additionally or alternatively, the first device may include a client device being used by a conferee to participate in the video conferencing.

In another aspect, a method includes, at a first device during video conferencing and based on at least one identified condition, selecting a first image from plural images received from a camera. The plural images are associated with the video conferencing. The method then includes, based on the selecting, providing the first image to a second device different from the first device.

In some examples, the at least one identified condition may include a first identified condition that itself includes a bandwidth issue and/or connectivity issue between client devices of a first conferee of the video conferencing and a second conferee of the video conferencing. The at least one identified condition may also include a second identified condition that itself includes the first image showing a conferee of the video conferencing as speaking.

Still further, if desired the at least one identified condition may include a client device being used for the video conferencing approaching and/or reaching a low battery power threshold, and/or a data transmission limit being approached and/or reached.

In still another aspect, at least one computer readable storage medium (CRSM) that is not a transitory signal includes instructions executable by at least one processor to, during video conferencing and based on an issue with a network being used for the video conferencing, select a first image from plural images received from a camera on a first device. The plural images are associated with the video conferencing. The instructions are also executable to provide the first image to a second device different from the first device and to decline to provide at least a second image from the plural images.

Additionally, in some example embodiments the instructions may be executable to, while the video conferencing transpires and based on a change to the issue with the network, dynamically adjust a number of images per second from the camera that are selected and provided to the second device as part of the video conferencing.

The details of present principles, both as to their structure and operation, can best be understood in reference to the accompanying drawings, in which like reference numerals refer to like parts, and in which:

BRIEF DESCRIPTION OF THE DRAWINGS

FIG. 6 shows an example settings GUI that may be used to configure one or more settings of a device to operate consistent with present principles.

DETAILED DESCRIPTION

Figure 1:
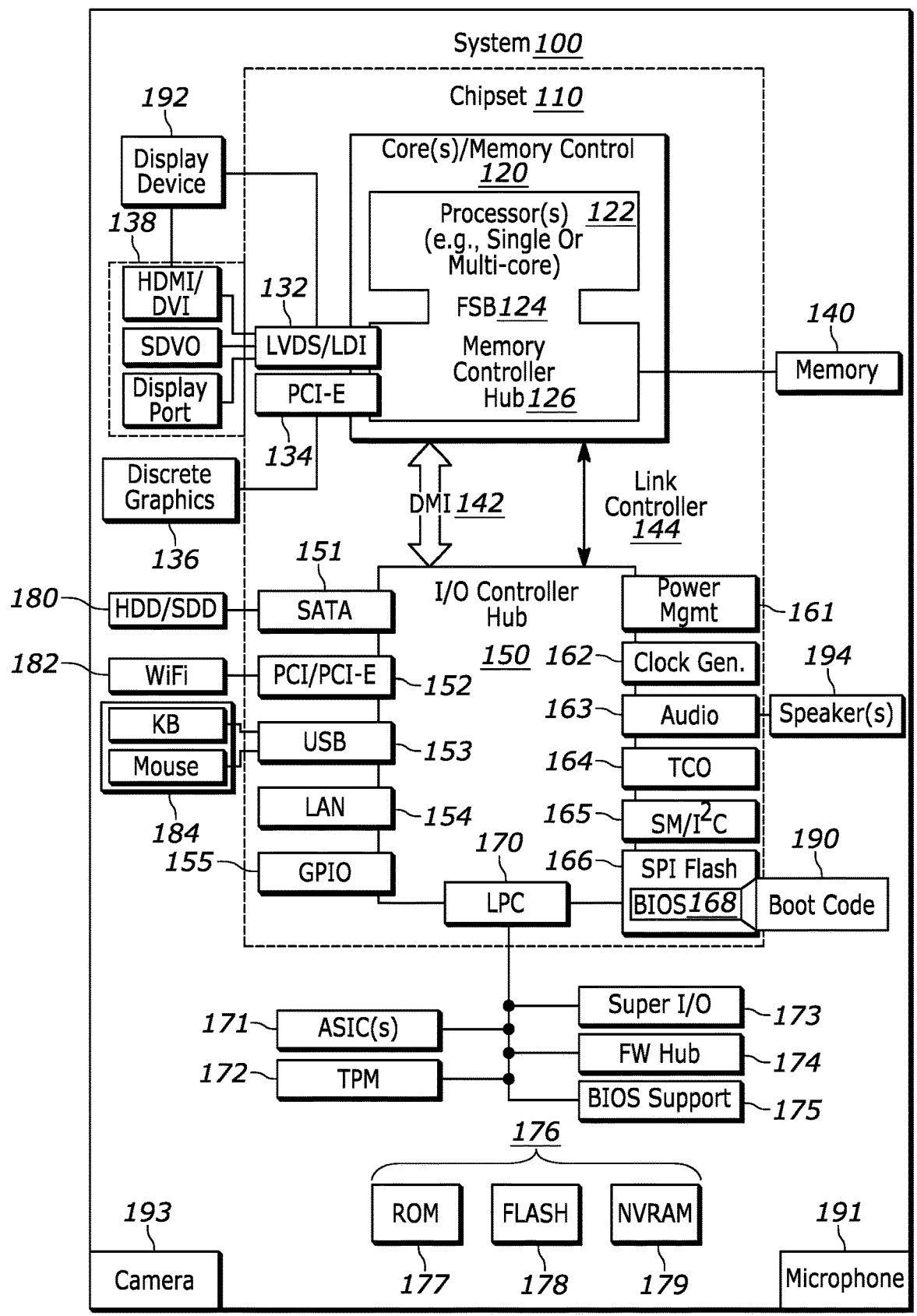
FIG. 1 is a block diagram of an example system consistent with present principles.

Among other things, the detailed description below relates to mobile device video transmission over one or more wireless cellular networks, Wi-Fi networks, wide-area networks, local-area networks, the Internet, or even Bluetooth networks and other types of networks.

Consistent with the principles set forth further below, during a video call, a client device and/or server in communication therewith may select ideal or preferable frames of the user's face for transmission to the other person on the other end of the video call. The user may even use a graphical user interface (GUI) to define minimum guideline(s) for transmission to occur.

Frame transmission by the client device may factor in the user looking at the local camera (or in its vicinity), the user being still (which may provide a less-blurred frame than other frames), the user smiling (which may provide a more flattering frame), and the user speaking as opposed to just listening.

The client device may also factor in metered networks, mobile data usage, data caps, overages/charges, etc. to transmit as little data as possible to optimize available network resources while still providing an acceptable video experience (e.g., as may be defined by the user).

Thus, "ideal" video frames may be chosen for transmission when using video on a mobile or metered connection, providing better frame quality with fewer frames while also minimizing potential network constraints.

Photo selection may leverage image processing methods such as gaze detection, smile detection, blur detection, etc. It may also leverage object detection to know when to filter a frame or not (e.g., for example, filter out frames showing the user taking a drink).

Thus, for example, a user might be using a mobile connection that, owing to any number of network factors, might result in jittery video transmission and less than ideal frames remaining in view (e.g., show frames of the user's mouth hanging open while speaking). To address this, the last or most-recent one-second video clip at 30 fps (which would therefore have 30 frames to choose from) may be analyzed. However, further note that the timeframe itself may be customized by the end-user to be something else. In any case, based on mobile data connection speed, one or more high-quality frames per second can be transmitted but not all 30 frames. The number of frames actually transmitted may even be adjusted up or down as the connection and/or network issues change.

Thus, the "top frame" for each second of the video call may be selected, where the user is looking closest to the camera, sitting still, etc. according to the top frame. The top frame may thus be transmitted to all other video call participants.

If the user speaks or if conditions change, the user's device may also fall back to lower quality, higher-FPS real-time video, or other settings configured by the user.

Accordingly, a more seamless experience may be provided via the devices disclosed herein while also improving the functioning of the conferencing system, network, and associated devices themselves.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 191 that provides input from the microphone to the processor 122 based on audio that is detected, such as via a user providing audible input to the microphone as part of a video conference consistent with present principles. The system 100 may also include a camera 193 that gathers one or more images and provides the images and related input to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather still images and/or video of a user as part of a video conference consistent with present principles.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
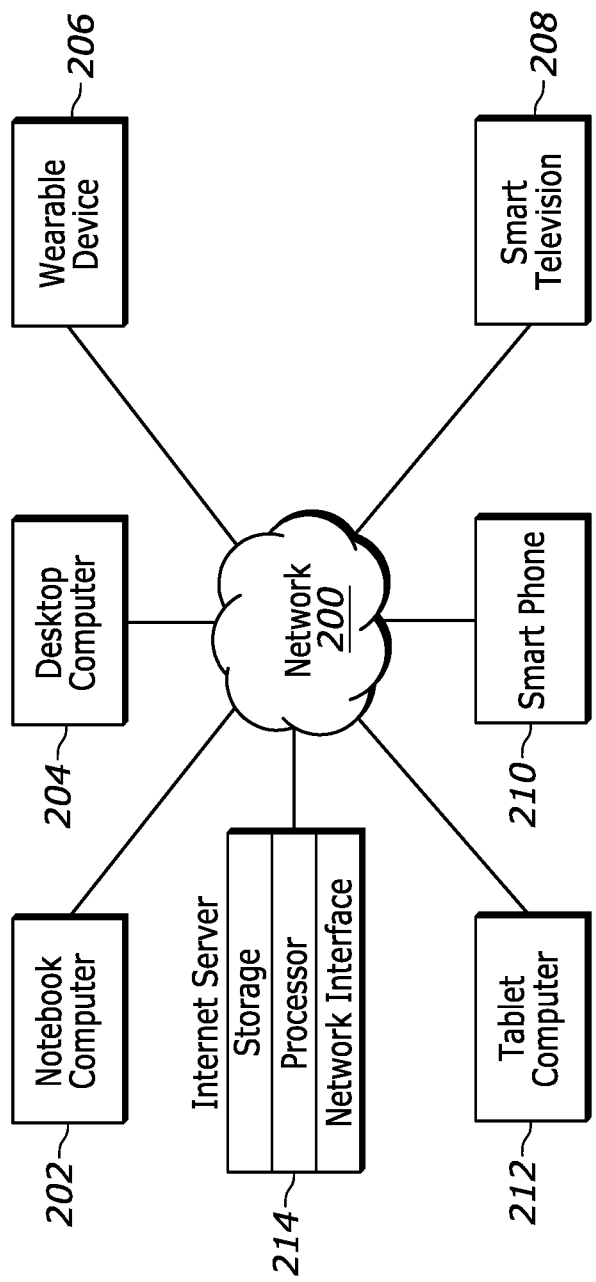
FIG. 2 is a block diagram of an example network of devices consistent with present principles.

Turning now to FIG. 2, example devices are shown communicating over a network 200 such as the Internet for video conferencing consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
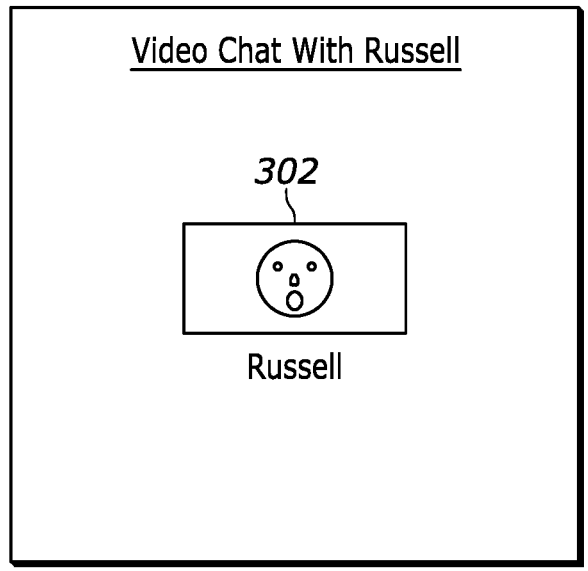
FIGS. 3 and 4 illustrate example video conference graphical user interfaces (GUI) consistent with present principles.

Referring now to FIG. 3, it shows an example graphical user interface (GUI) 300 that may be presented on the display of a first client device such as a smartphone, tablet, or laptop computer during video conferencing between a first conferee named Rob (who is using the first client device) and a remotely-located second conferee Russell (who is using a second client device). As shown, the first client device is attempting to present a real-time video feed of Russell as received from the second client device, possibly as routed through a coordinating server over the Internet. As also shown, owing to a bandwidth issue such as limited or insufficient bandwidth for transmitting all frames of Russell's video stream in real time, or even owing to a network connectivity issue where there might be connection disruptions or intermittent connection between the two devices, a single frame 302 of Russell persists on the display of the first client device such that the single static image frame 302 is presented across a relatively lengthy period of time when real-time video with multiple different image frames would otherwise be presented.

As may also be appreciated from FIG. 3, the frame 302 shows Russell's mouth agape while he is not talking, which is less than desirable to say the least. The persistent frame 302 may even give the impression to the viewer Rob that the video conferencing application as executing at his client device (the first client device) is frozen or otherwise malfunctioning, leading to confusion and potential breaks in the conversation with Russell.

Figure 4:
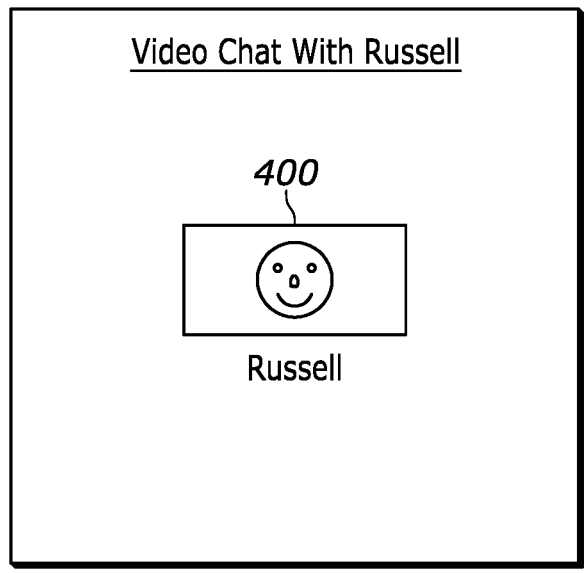

To address this and consistent with present principles, FIG. 4 shows that the first client device may instead receive a different frame 400 from Russell's device that may also be persistently presented in place of real-time video of Russell that would have multiple frames presented over the same period of time as the frame 400. But note that in the frame 400, Russell is shown as smiling, which is much more complimentary and might not lead to a similar impression on Rob's part that his application is not executing correctly (or that there is another issue somewhere along the transmission line between the two client devices).

Figure 5:
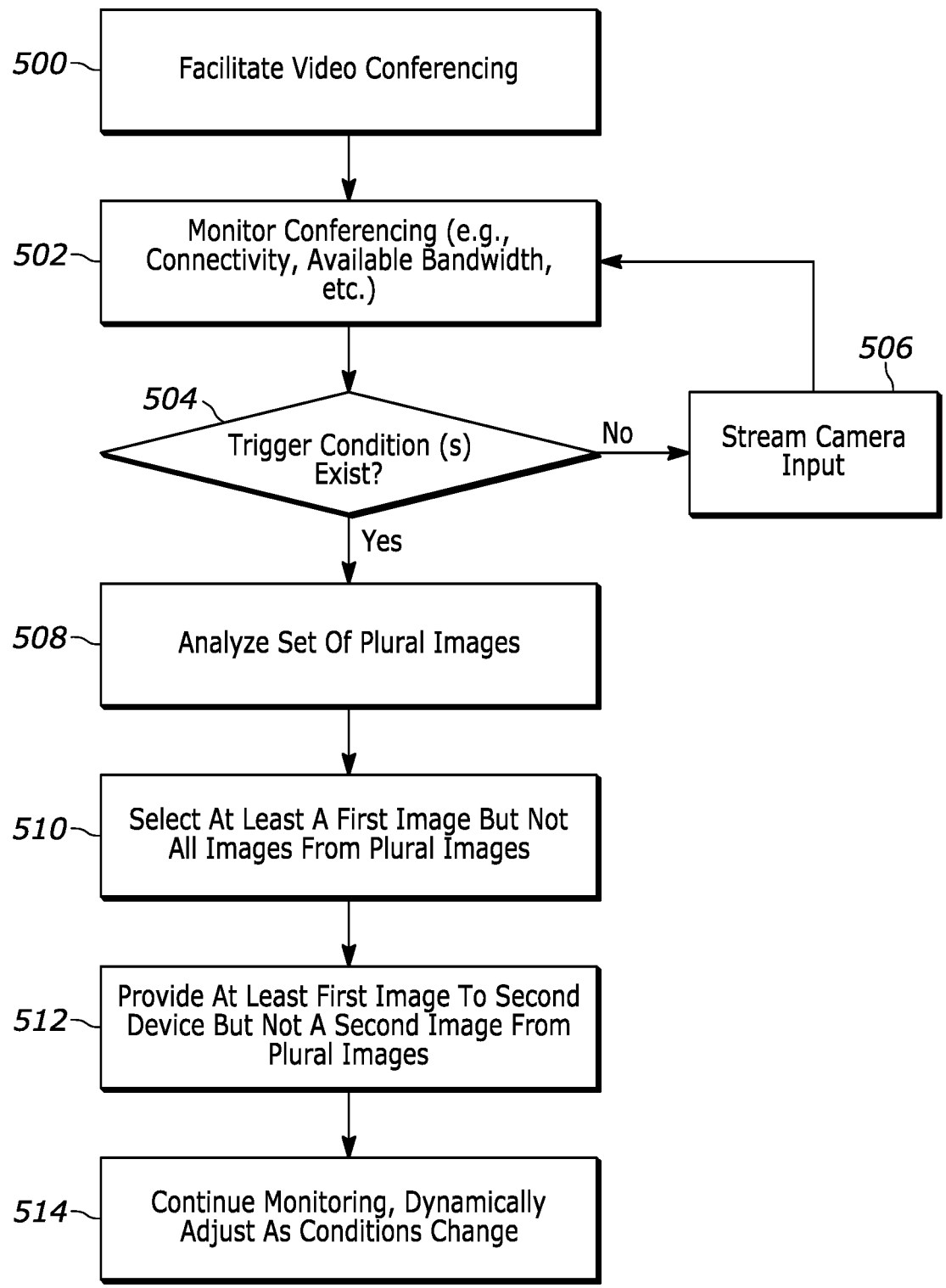
FIG. 5 shows example logic in example flow chart format that may be executed by a device consistent with present principles.

FIG. 5 shows example logic consistent with present principles that may be executed alone or in any appropriate combination by a client device such as Russell's device from above and/or a coordinating server in order to mitigate the negative effects of network issues that might occur during a video conference and thus improve the electronic conferencing itself. The network issues might arise on an open Internet leg of the communication link between the two (or more) client devices, or even a Wi-Fi leg, a wired LAN leg, wireless cellular leg, etc. Note that while the logic of FIG. 5 is shown in flow chart format, other suitable logic may also be used. Also note that the device executing the logic of FIG. 5 will be referred to below as the "first device".

Beginning at block 500, the first device may facilitate video conferencing with another device, such as by executing a local copy of the same video conferencing software used by one or more other conferees for the same conference to transmit audio data from a local microphone and video data from a local camera to the other conferee(s) as part of the conference. The software may also be executed to receive audio and video data from one or more of the other client devices for presentation locally at the first device as part of the conference. Or if the first device is a coordinating server, at block 500 the server may route the various A/V streams between the conferees' respective client devices so they can each see and hear each other at their own respective client devices. After block 500, the logic may proceed to block 502.

At block 502 the first device may monitor the conferencing, including monitoring for one or more trigger conditions that might arise and instigate the first device to take action. The conditions might include a network connectivity issue, an insufficient bandwidth issue even if a constant connection is maintained, or another condition as set forth herein. If the condition is a network issue, the issue may be identified based on, e.g., a request from another one of the client devices to re-send dropped packets, the first device itself determining that only limited bandwidth exists as monitored continually at the first device using network monitoring software, the first device detecting a dropped or lost network connection, etc. From block 502 the logic may then proceed to decision diamond 504.

At diamond 504 the first device may determine, based on the monitoring performed at block 502, whether one or more of the trigger conditions actually exist/are occurring during the video conferencing. A negative determination at diamond 504 may cause the logic to proceed to block 506, where the first device may stream its own real time camera video feed from its own local camera to one or more other client devices participating in the video conference (e.g., if the first device is a client device), and/or where the first device may relay the camera feed from one client device to another (e.g., if the first device is a coordinating server). After this, the logic may proceed from block 506 back to block 502 and proceed therefrom.

However, should an affirmative determination be made at diamond 504 rather than a negative one, the logic may instead proceed to block 508. At block 508 the first device may analyze a set of plural images from its local camera (e.g., if the first device is a client device) or a set of plural images as provided by a client device (e.g., if the first device is a server). For instance, the first device may analyze a particular number of image frames per second that would otherwise be streamed in real time to one or more other conferees (e.g., a grouping of 30 frames per second (fps)). Various image processing techniques may be used for performing the analysis, including facial recognition, object recognition, boundary recognition, emotion recognition, blur detection, gesture recognition, eye tracking, motion detection, etc.

From block 508 the logic may then proceed to block 510 where, based on the analysis at block 508, the first device may select at least a first image. However, note that in example embodiments the first device may not select all images from the given set that was analyzed.

As for the selected images themselves, various images may be selected or not selected based on one or more identified conditions. For example, images may be selected that show a conferee's face but not images that fail to show the conferee's face (e.g., like if they duck out of the camera's field of view for a moment). As another example, images showing the conferee looking at or near the conferee's local camera may be selected but not images of the conferee looking down or off to the side. Additionally, images showing the conferee smiling may be selected but not images showing the conferee frowning, crying, or even straight-faced. Still further, no images may be selected from the set that show the conferee's mouth agape while not concurrently speaking (e.g., since the agape mouth shape is not part of audible word formation) but may select images where the conferee does not having their mouth agape even if not concurrently speaking.

Providing still other examples of conditions that may result in image selection from the set of images, images may be selected that exhibit a lack of blurry feature boundaries for the conferee's face while images that show one or more blurry feature boundaries for the conferee's face may not be selected. Still further, images may be selected that show the conferee as speaking, while images showing the conferee as not speaking and/or with their mouth closed for at least a threshold period of time may not be selected (e.g., such as for a period of two seconds to avoid false positives where there might be a momentary pause in speech).

Thus, based on one or more identified network conditions and/or one or more other conditions identified from images in the set itself, the first device may be triggered to narrow down the number of images is transmits per time increment in order to limit its bandwidth consumption and other network resource consumption, thereby improving the overall functioning of the network itself while the network's issues are resolved. Accordingly, from block 510 the logic may proceed to block 512 where the first device may actually provide the selected image(s) to a second client device and even N additional client devices corresponding to the number of other conferees participating in the video conference.

Before moving on to the next step in the logic of FIG. 5, note here that still other conditions might trigger transmission of a subset of images from a given set or real-time camera feed, even if for example there are no bandwidth or network connectivity issues. For example, a given client device being used for the video conferencing approaching and/or reaching a low battery power threshold may be a condition that triggers transmitting still images rather than a real time video feed from the client device's camera. The low battery power threshold may be ten or fifteen percent as configured by the device manufacturer, developer, or even the conferee himself or herself.

As another example, if a given client device is only allotted a certain amount of data transmission per month according to their wireless cellular data plan, and the data transmission limit is reached or is being approached to within a threshold amount, the client device's cellular service software may report as much to instigate that respective client device to stop transmitting real time video and to instead select one or more images at block 510.

As yet another example, where a metered network is used in that there might not be a data cap for a given week or month per se, but the network provider still limits bandwidth in real time to only allow a certain amount of data per second or minute to be transmitted by the client device to alleviate network congestion, the first device may use an Internet speed-checking website or network monitoring software to identify a cap or max amount of data being allowed for transmission and use that as a triggering condition for selecting one or more images at block 510 rather than providing a real-time video feed. Or, a base station or other network infrastructure might report the cap to the client device to trigger image selection at block 510.

Still further, note that if the client device does not have a "hard stop" data cap per set but the client device has access to data indicating that additional charges will be incurred beyond a regular monthly billing amount once the client device goes past a certain amount of data transmitted per week or month, the client device reaching the point at which additional charges will be incurred (or a threshold amount of data less than that point) may be a trigger for still image selection at block 510 rather than real-time video transmission.

Continuing with the description of FIG. 5, from block 512 the logic may next proceed to block 514. At block 514 the first device may repeat the logic of FIG. 5 to continue monitoring the video conference and dynamically adjust a number of images per second from the same camera that are selected and provided to the other client devices of the other conference participants as conditions change. For example, if a bandwidth or connectivity issue is resolved, dynamic adjustment may include beginning to stream video in real time at a particular number of frames per second in a normal video conferencing operation mode. Or if bandwidth or connectivity improves but is still not sufficient for normal real-time video streaming, more image frames may be selected and streamed per second even if not at the normal stream rate. Conversely, if bandwidth or connectivity deteriorates even more, less frames per second may be selected and streamed.

Furthermore, note here that in some examples the frame analysis may be optimized for power/battery savings in the respective client device/server itself to not consume an undue amount of power analyzing various image sets during conferencing. For example, dynamically in real time the first device may increase the number of frames captured and/or analyzed per time increment, increase the time increment itself to encompass a larger amount of images, and/or decrease the selected image transmission/update frequency if acceptable frames cannot be obtained. E.g., if one of the conditions for image frame selection is images not showing the conferee without their mouth agape, but all frames for a given set show the user's mouth agape, a set of images gathered over a longer period of time may be analyzed (e.g., 30 fps but over a two-second span rather than one-second span) to select one image to transmit every two seconds rather than one image to transmit every one second. Likewise, if only one image or even a threshold max amount of images satisfying a condition are to be transmitted per time increment, but more than enough images from a given set conform to the condition, the first device may decrease the number of frames that are captured and/or analyzed per time increment, and/or increase the selected image transmission/update frequency.

Even further, if desired in some example implementations the first device may take periodic still shots in burst mode to obtain suitable frames. Thus, here a set of image frames from a burst mode still shot (multiple frames captured in a short period of time, but still not video per se) may be analyzed and one of them selected. In other words, rather than analyzing a set of images from real-time video from a local camera for the conferee, burst-shot still frame groupings may be analyzed.

Continuing the detailed description in reference to FIG. 6, it shows an example settings GUI 600 that may be presented on the display of a client device for an end-user to configure one or more settings of the device and/or conferencing system according to user preferences consistent with present principles. For example, the GUI 600 may be reached by navigating a settings menu for the client device itself or navigating local copy of the video conferencing service's software. Also note that in the example shown, each option discussed below may be selected by directing touch or cursor input to the respective check box adjacent to the respective option.

As shown in FIG. 6, the GUI 600 may include a first option 602 that may be selected to set or configure the client device and/or conferencing software to enable dynamic, optimal image selection for one or more future video conferences consistent with present principles (e.g., rather than attempting to stream real-time video during conferencing regardless of network conditions as might otherwise occur). For example, the option 602 may be selected to set or enable the device execute the logic of FIG. 5 for ensuing video conferences.

The GUI 600 may also include another option 604 that may be selected to specifically command the client device or conferencing software to transmit higher-resolution images (as still selected from a larger set of images) rather than transmitting a relatively lower-resolution image or downscaled version that itself might form part of a real-time video feed from a local camera. This may be done based on the understanding that video conferencing services often stream lower resolution feeds when streaming video, but since the overall bandwidth consumption is being reduced owing to one or more still images being transmitted rather than the real-time video itself, a higher-resolution image may be transmitted according to the logic of FIG. 5 while still consuming less bandwidth than real-time video otherwise would. So, for example, if real-time video is streamed at 480i, 480p, or even 720p for a given conferencing service, still images may be transmitted in 1080p or even 4k to provide an enhanced image viewing experience for the conferee on the other end of the video call even if they cannot see real-time video of the other person.

FIG. 6 also shows that various conditions may be selected by the end-user via various respective options 606. And as may be appreciated from FIG. 6, various options for the conditions already described above may be presented. Other example conditions for image selection not described above but still listed on the GUI 600 include images of the conferee being still or not moving, as well as images of the conferee not performing certain actions. For example, images showing actions such as taking a drink of water and other end-user actions that are unrelated to the act of video conferencing may be omitted from selection. Likewise, images showing the conferee interacting with particular objects unrelated to video conferencing may be omitted from selection (e.g., placing a cup to the user's mouth to drink). Further note that other options 606 may also be presented for still other conditions described herein but not explicitly listed on the GUI 600 for simplicity.

FIG. 6 also shows that a setting 608 may be presented as part of the GUI 600. The setting 608 may relate to establishment of a low battery power threshold that, when reached, may trigger the transmission of a subset of images from a camera rather than a real-time video feed as described above. Thus, an end-user may enter numerical input via hard or soft keyboard into input box 610 to establish the threshold as a particular percentage state of charge remaining.

It may now be appreciated that present principles provide for an improved computer-based user interface and network management that increases the functionality and ease of use of the devices and networks disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   during video conferencing and based on at least one identified condition, select a first image from plural images received from a camera, the plural images being associated with the video conferencing; and provide the first image to a second device different from the first device but decline to provide at least a second image from the plural images;

wherein the at least one identified condition comprises a first identified condition, the first identified condition comprising the first image exhibiting a lack of blurry feature boundaries for a conferee's face, the second image comprising at least one blurry feature boundary for the conferee's face.

2. The first device of claim 1, wherein the plural images are established by a particular number of frames per time increment.

3. The first device of claim 1, wherein the at least one identified condition comprises the conferee's face being shown in the first image.

4. The first device of claim 1, wherein the at least one identified condition comprises the conferee, as shown in the first image, looking at the camera.

5. The first device of claim 1, wherein the at least one identified condition comprises the conferee smiling as shown in the first image.

6. The first device of claim 1, wherein the at least one identified condition comprises a second identified condition, the second identified condition comprising the conferee not having their mouth agape while not speaking as shown in the first image.

7. The first device of claim 6, wherein the second image shows the conferee's mouth agape while not speaking.

8. The first device of claim 6, wherein the conferee is a first conferee of the video conferencing, and wherein the at least one identified condition comprises a third identified condition different from the first identified condition, the third identified condition comprising a bandwidth issue and/or connectivity issue between client devices of the first conferee and a second conferee with whom the first conferee is conversing as part of the video conferencing.

9. The first device of claim 1, wherein the conferee is a first conferee of the video conferencing, and wherein the at least one identified condition comprises a second identified condition different from the first identified condition, the second identified condition comprising a bandwidth issue and/or connectivity issue between client devices of the first conferee and a second conferee with whom the first conferee is conversing as part of the video conferencing.

10. The first device of claim 1, comprising the camera.

11. The first device of claim 1, wherein the first device comprises a server facilitating the video conferencing, the first device receiving the plural images from a third device established by a client device.

12. The first device of claim 11, comprising the second and third devices.

13. The first device of claim 1, wherein the first device comprises a client device being used by the conferee to participate in the video conferencing.

14. A method, comprising:
at a first device during video conferencing and based on at least one identified condition, selecting a first image from plural images received from a camera, the plural images being associated with the video conferencing; and based on the selecting, providing the first image to a second device different from the first device;

wherein the at least one identified condition comprises a first identified condition, the first identified condition comprising the first image exhibiting a lack of blurry feature boundaries for a conferee's face.

15. The method of claim 14, wherein the at least one identified condition comprises a second identified condition, the second identified condition comprising a bandwidth issue and/or connectivity issue between client devices of a first conferee of the video conferencing and a second conferee of the video conferencing.

16. The method of claim 15, wherein the at least one identified condition comprises a third identified condition, the third identified condition comprising the first image showing the conferee as speaking.

17. The method of claim 14, wherein the at least one identified condition comprises a client device being used for the video conferencing one or more of: approaching a low battery power threshold, reaching the low battery power threshold.

18. The method of claim 14, wherein the at least one identified condition comprises a data transmission limit being one or more of: approached, reached.

19. At least one computer readable storage medium (CRSM) that is not a transitory signal, the computer readable storage medium comprising instructions executable by at least one processor to:

during video conferencing and based on at least one identified condition, select a first image from plural images received from a camera on a first device, the plural images being associated with the video conferencing, and based on the selection, provide the first image to a second device different from the first device;

wherein the at least one identified condition comprises a first identified condition, the first identified condition comprising the first image exhibiting a lack of blurry feature boundaries for a conferee's face.

20. The CRSM of claim 19, wherein the instructions are executable to:

while the video conferencing transpires and based on a change to an issue with a network, dynamically adjust a number of images per second from the camera that are selected and provided to the second device as part of the video conferencing.

* * * * *